(12) United States Patent
Asahi

(10) Patent No.: US 6,603,570 B2
(45) Date of Patent: Aug. 5, 2003

(54) IMAGE PROCESSING APPARATUS, DATA PROCESSING METHOD AND COMPUTER-READABLE MEMORY MEDIUM FOR STORING PROGRAM

(75) Inventor: Takako Asahi, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/314,110

(22) Filed: May 19, 1999

(65) Prior Publication Data

US 2003/0081239 A1 May 1, 2003

(30) Foreign Application Priority Data

May 20, 1998 (JP) .......................................... 10-138925

(51) Int. Cl.[7] .............................................. G06F 13/00
(52) U.S. Cl. ..................... 358/1.15; 358/1.16; 358/1.17
(58) Field of Search ................................. 358/1.1, 1.12, 358/1.13, 1.14, 1.15, 1.16, 1.17, 404, 444; 399/144

(56) References Cited

U.S. PATENT DOCUMENTS 5,970,222 A  * 10/1999  Gusmano et al. ........... 358/1.15
6,240,481 B1 *  5/2001  Suzuki ........................ 710/129
6,288,791 B1 *  9/2001  Minamizawa .............. 358/1.15

* cited by examiner

*Primary Examiner*—Mark Wallerson
(74) *Attorney, Agent, or Firm*—Fitzpatrick, Cella, Harper & Scinto (57) ABSTRACT

For an image processing apparatus that can execute a plurality of functions, a common area that can be shared by the individual functions is provided in addition to the memory areas that are prepared for these functions. During the printing process, a check is performed to determine whether the common area is available for use as a print buffer. When the common area is not available, an area prepared in advance as a print buffer is employed to print image data in a single buffer system. When the common area is available, a print buffer for at least one page is obtained in therein, and a plurality of print buffers are alternately accessed to develop and to output image data (double buffer system).

18 Claims, 8 Drawing Sheets

IMAGE PROCESSING APPARATUS, DATA PROCESSING METHOD AND COMPUTER-READABLE MEMORY MEDIUM FOR STORING PROGRAM

BACKGROUND OF THE INVENTION

1. Field of the Invention

The present invention relates to a multi-functional image processing apparatus, for permitting a printer and a scanner to execute digital copying and for permitting a printer to print an image received by facsimile, and a data processing method therefor, and to a memory medium on which a computer-readable program is stored.

2. Related Background Art

A digital copier can be used for facsimile and for copying, and as a printer for a PC. In a digital copier, dedicated storage areas are provided for different types of data, such as, for example, FAX data. And when storing data, image data that are read are transmitted through a codec that compresses or decompresses data, and the resultant compressed data are stored in a pertinent storage area.

When data are printed, compressed data are decompressed, and the resultant data are first stored in a print buffer and then printed.

In a conventional image processing apparatus of this type, for printing control, two print buffer systems are employed: a single buffer system that employs a single fixed buffer for one page, and a double buffer system that employs a fixed double buffer.

The single buffer system extracts image data for one page that are stored for the individual functions, decompresses the image data, and stores the resultant data in a print buffer to await printing. When the image data for one page have been printed and the print buffer has been emptied, the system decompresses and prints image data for the next page.

The double buffer system has print buffers for two pages in which decompressed data for printing are to be stored. Therefore, while image data for one page are being printed from one of the print buffers, image data for the next page are being developed in the other print buffer.

Generally, a digital copier having an electronic sorting function has a memory for storing compressed image data. And a copier having a facsimile function and a printing function has memories allocated for the storage of these functions. The same fixed memory areas are defined for these memories and for a page buffer used for page printing.

However, since during the printing process the conventional single buffer system must wait until the printing of data for one page has been completed, an extended period of time is required. And since the double buffer system, while faster and more efficient than the single buffer system, requires a storage area that is twice as large, it is also more expensive.

That is, since fixed areas are established for the storage of image data and for a print buffer, the mounted memory resources can not be effectively utilized, and during the execution of the printing process, the printing throughput is deteriorated.

SUMMARY OF THE INVENTION

To overcome the above shortcomings, one objective of the present invention is to provide an image processing apparatus that, when an image memory is provided for individual functions and when a common memory is also provided that can be shared by these functions, determines during the execution of a printing process whether a print buffer for one page can be obtained in the common area, and alternately develops or outputs data stored in a plurality of print buffers; that dynamically obtains the maximum number of print buffers required for a plurality of pages in accordance with the condition of the memory in the common area during the execution of individual functional processes; and that provides a data processing method whereby the efficiency of the development and printing of print data is markedly improved and the printing speed is increased, and a memory medium on which a computer-readable program is stored.

To achieve the above objective, according to the present invention, an image processing apparatus, which during image processing simultaneously performs multiple functions while employing an image memory that is used by a printer and a scanner to perform digital copying, comprises:

acquisition means for acquiring, in the image memory, a data storage area for each of the multiple functions that are being performed and a common area that is used in common by the individual functions;

determination means for determining, during a printing process performed by the printer, whether in addition to the data storage area acquired in the image memory, a print buffer area for one page can be obtained in the common area; and control means for, when the determination means ascertains that a print buffer area for one page can not be obtained in the common area, accessing the data storage area for the image memory, and developing print data for one page and employing the printer to print the resultant data, and for, when the determination means determines that a print buffer area for one page can be obtained in the common area, accessing the data storage area and the common area in the image memory, and developing print data for one page and employing the printer to print the resultant data.

Preferably, the image processing apparatus further comprises compression/decompression means for compressing data to be stored in the data storage area acquired in the image memory, or for decompressing data read from the data storage area.

It is also preferable that the determination means determine that a print buffer area for one page can not be obtained in the common area when the determination means ascertains that a job for writing to the common memory is being currently being executed or is to be executed.

According to the present invention, a data processing method, for an image processing apparatus that during image processing simultaneously performs multiple functions while employing an image memory that is used by a printer and a scanner to perform digital copying, comprises:

an acquisition step of acquiring, in the image memory, a data storage area for each of the multiple functions that are being performed and a common area that is used in common by the individual functions;

a determination step of determining, during a printing process performed by the printer, whether in addition to the data storage area acquired in the image memory, a print buffer area for one page can be obtained in the common area;

a first development/output step of, when it is ascertained at the determination step that a print buffer area for one page can not be obtained in the common area, accessing the data storage area for the image memory, and developing print data for one page and employing the printer to print the resultant data; and a second development/output step of, when it is ascertained at the determination step that a print buffer area for one page can be obtained in the common area, accessing the data storage area and the common area in the image memory, and developing print data for one page and employing the printer to print the resultant data.

Preferably, the data processing method further comprises a compression/decompression step of compressing data to be stored in the data storage area acquired in the image memory, or of decompressing data read from the data storage area.

It is also preferable that it should be determined at the determination step that a print buffer area for one page can not be obtained in the common area when it is ascertained at the determination step that a job for writing to the common memory is being currently being executed or is to be executed.

According to the present invention, a memory medium, on which a computer-readable program is stored for controlling an image processing apparatus that during image processing simultaneously performs multiple functions while employing an image memory that is used by a printer and a scanner to perform digital copying, comprises:

an acquisition step of acquiring, in the image memory, a data storage area for each of the multiple functions that are being performed and a common area that is used in common by the individual functions;

a determination step of determining, during a printing process performed by the printer, whether in addition to the data storage area acquired in the image memory, a print buffer area for one page can be obtained in the common area;

a first development/output step of, when it is ascertained at the determination step that a print buffer area for one page can not be obtained in the common area, accessing the data storage area for the image memory, and developing print data for one page and employing the printer to print the resultant data; and a second development/output step of, when it is ascertained at the determination step that a print buffer area for one page can be obtained in the common area, accessing the data storage area and the common area in the image memory, and developing print data for one page and employing the printer to print the resultant data.

Preferably, the program stored on the memory medium further comprises a compression/decompression step of compressing data to be stored in the data storage area acquired in the image memory, or of decompressing data read from the data storage area.

It is also preferable that it should be determined at the determination step that a print buffer area for one page can not be obtained in the common area when it is ascertained at the determination step that a job for writing to the common memory is being currently being executed or is to be executed.

In accordance with the change in the memory used during the execution of the individual functions, the common area can flexibly serve as a memory area for each of the functions. During the printing process, so long as a print buffer area for one page can be acquired in the common area, print data stored in a plurality of print buffers can continuously be alternately developed and output. As a result, the efficiency of the printing process can be markedly improved, and a considerable increase in printing speed can be realized.

In addition, since the compression/decompression means is included that compresses data which is to be stored in the data storage area acquired in the image memory for each function, or that decompresses data read from the data storage areas, the memory capacity required for the data storage area can be reduced and a data processing environment can be constructed wherein only a small memory capacity is required for the effective performance of multiple functions.

Furthermore, the determination means determines that a print buffer area for one page can not be obtained in the common area when it is ascertained a job for writing to the common memory is being currently being executed, or is to be executed. Therefore, when data processing is being simultaneously performed by a plurality of functions, and when as result of the execution of one of these functions the common area is in use and is not available, multi-function processing can be implemented during which printing can be continued by using a single print buffer, even though the processing speed is reduced.

Further, according to the present invention, since the compression/decompression step is included for compressing data which is to be stored in the data storage area acquired in the image memory for each function, or for decompressing data read from the data storage areas, the memory capacity required for the data storage area can be reduced and a data processing environment can be constructed wherein only a small memory capacity is required for the effective performance of multiple functions.

Furthermore, it is determined at the determination step that a print buffer area for one page can not be obtained in the common area when it is ascertained a job for writing to the common memory is being currently being executed, or is to be executed. Therefore, when data processing is being simultaneously performed by a plurality of functions, and when as result of the execution of one of these functions the common area is in use and is not available, multi-function processing can be implemented during which printing can be continued by using a single print buffer, even though the processing speed is reduced.

Therefore, while the maximum number of print buffers required for a plurality of pages are dynamically obtained in accordance with the condition of the memory in the common area used by all of the functional process, the efficiency in the development and the output of print data is considerably improved and a marked increase in the printing speed is achieved.

Objectives and advantages other than those discussed above will become apparent to those skilled in the art during the course of the description of the preferred embodiments of the invention that follows. In the description, reference is made to accompanying drawings, which form a part thereof and which illustrate an example of the invention. Such an example, however, is not an exhaustive recital of the various embodiments of the invention, and reference is therefore made to the claims that follow the description for a determination of the scope of the invention.

DETAILED DESCRIPTION OF THE PREFERRED EMBODIMENT

The preferred embodiment of the present invention will now be described while referring to the accompanying drawings.

Figure 1:
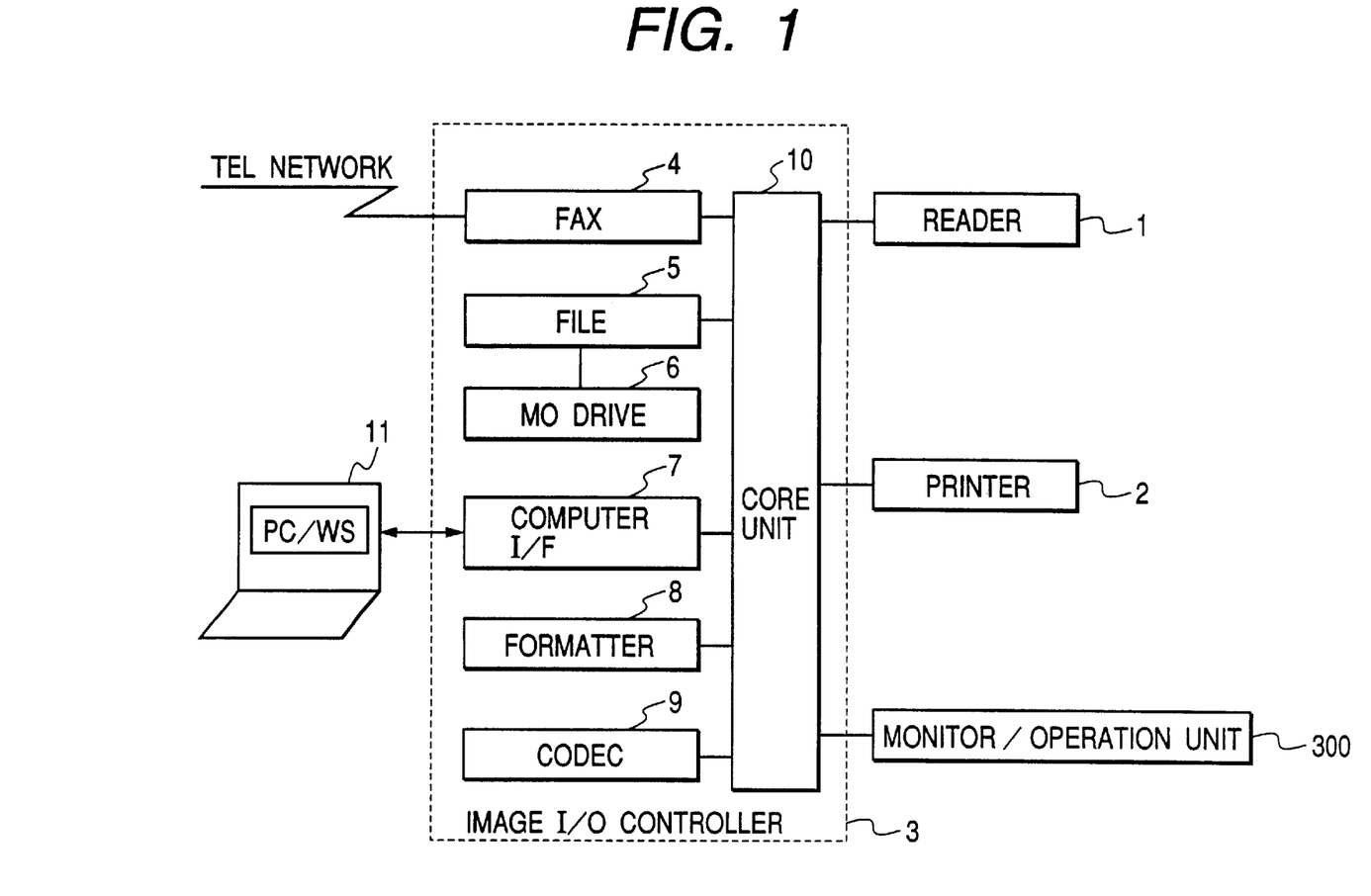
FIG. 1 is a block diagram for explaining the arrangement of an image processing apparatus according to the present invention.

FIG. 1 is a block diagram for explaining the structure of an image processing apparatus according to the present invention, which corresponds to a multi-functional image processing apparatus that serves as a digital copier and a printer and as a facsimile machine. It should be noted, however, that so long as a multi-functional image processing apparatus serving as a digital copier is provided with an image memory to be used for each functional process, the present invention can be applied for an image processing apparatus wherein a core unit communicates with each processor to perform image processing, or for a so-called SOHO type image processing apparatus having multiple functions, including a laser facsimile function, a copy function, a phone function, a laser printing function, a PC facsimile function, a scanner function and a filing function.

In FIG. 1, a reader 1 reads a document image and outputs the image data to an image I/O controller 3. A printer 2 records on a recording sheet an image that is based on image data received by the reader 1 and the image I/O controller 3. The image I/O controller 3 is connected to the reader 1, and includes a facsimile unit 4, a file unit 5, a computer I/F 7, a formatter 8, a codec 9 and a core unit 10.

In the image I/O controller 3, the facsimile unit 4 receives compressed image data that are transmitted across a phone line, and transmits across a phone line compressed image data that are received from the core unit 10.

An MO disk drive unit 6 is connected to the file unit 5, and the file unit 5 stores compressed image data that are received from the core unit 10 on a magneto-optical disk that is mounted in the MO disk drive unit 6, along with a keyword that is used when searching for the compressed image data. Further, upon receiving a keyword from the core unit 10, the file unit 5, based on the keyword, institutes a search for compressed image data that are stored on a MO disk mounted in the drive unit 6, and transmits to the core unit 10 image data that are found.

The computer I/F 7 is an interface positioned between a personal computer or workstation (PC/WS) 11 and the core unit 10. The formatter 8 develops code data representing an image, which are transmitted by the PC/WS 11, in order to obtain image data that can be printed by the printer 2. The codec 9 compresses or decompresses image data. And the core unit 10 controls the transmission of data, which will be described later, among the reader 1, the facsimile unit 4, the file unit 5, the computer I/F 7, the formatter 8 and the codec 9.

A monitor/operation unit 300, which is connected to the core unit 10 of the image I/O controller 3, displays various types of setup information and messages, and various setups can be effected and operations performed by a user by manipulating keys on its panel.

Figure 2:
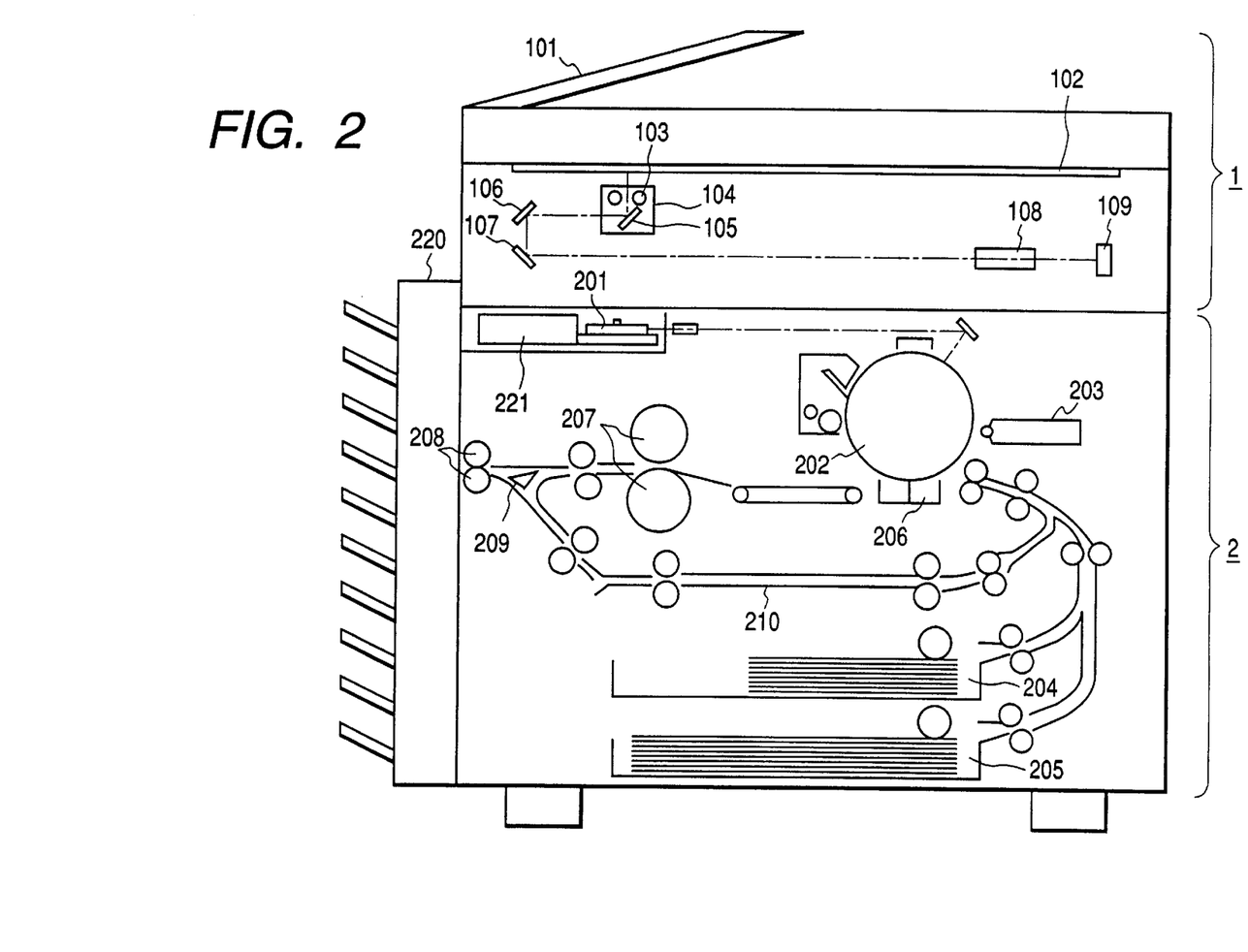
FIG. 2 is a cross-sectional view of the structures of a reader and a printer shown in FIG. 1.

FIG. 2 is a cross-sectional view of the structures of the reader 1 and the printer 2 shown in FIG. 1. The reference numerals used in FIG. 1 are also employed to denote corresponding components in FIG. 2.

In the reader 1, a document feeder 101 feeds a document to a glass platen 102 page by page, beginning with the last page, and removes each page from the glass platen 102 and discharges it after it has been scanned. A scanner unit 104, which includes lamps 103 and a mirror 105, moves along a document page on the glass platen 102 and scans the page while illuminating it with the lamps 103.

An image sensor (hereinafter referred to as a CCD) 109 receives light that is reflected by the document and that is guided to the sensor by mirrors 105, 106 and 107 and a lens 108, and outputs image data. Predetermined processing is performed for the image data received from the CCD 109, and the resultant data are transmitted to the printer 2 and the core unit 10 of the image I/O controller 3.

In the printer 2, a laser driver 221 drives a laser emitter 201 that, in consonance with image data that are output by the reader 1, emits a laser beam that is used to irradiate the surface of the photosensitive drum 202 and to form a latent image thereon. Thereafter, a predetermined developer, supplied from a developing unit 203, is attached to and develops the latent image formed on the photosensitive drum 202. Meanwhile, concurrent feeding of a paper recording sheet stored in either cassette 204 or 205 is initiated in synchronization with the initial emission of the laser beam used to irradiate the photosensitive drum 202.

Thereafter, a transfer unit 206 transfers the developer attached to the photosensitive drum 202 to the recording sheet, which was extracted from either the cassette 204 or the cassette 205, and a fixing unit 207, to which the recording sheet is transferred by the transfer unit 206, applies pressure to the recording sheet and thermally fixes the developer thereto. Then, after the recording sheet has passed through the fixing unit 207, it is discharged by discharge rollers 208 to a sorter 220, whereby recording sheets are sorted to and stored in individual storage bins. When sorting has not been instructed, however, the sorter 220 stores all recording sheets in the topmost storage bin.

When double-sided printing or multiplex printing is instructed, a flapper 209 is employed to guide a recording sheet to a sheet feedback path 210.

The operations of the individual sections will now be described.

When a document is fed to the glass platen 102 by the document feeder 101 of the reader 1, the lamps 103 are turned on, and the scanner unit 104 begins to move and to illuminate and scan the document.

The light reflected from the document is guided to the CCD by the mirrors 105, 106 and 107 and the lens 108, and the image of the document is acquired by the CCD 109. Predetermined processing is thereafter performed for image data output by the CCD 109, and the resultant data are transmitted to the printer 2 and the core unit 10 of the image I/O controller 3.

In the printer 2, the laser driver 221 drives the laser emitter 201 that, in consonance with the image data output by the reader 1, emits a laser beam which is used to irradiate the surface of the photosensitive drum 202 and to form a latent image thereon. Thereafter, the developer supplied by the developing unit 203 is attached to and develops the latent image on the photosensitive drum 202. Meanwhile, in synchronization with the emission of the laser beam used to irradiate the photosensitive drum 202, a recording sheet, which was stored in either the cassette 204 or the cassette 205, is fed to the transfer unit 206, and the developer attached to the photosensitive drum 202 is transferred to the recording sheet.

Subsequently, the recording sheet, to which the developer now adheres, is transferred to the fixing unit 207, whereat pressure and heat are applied to the sheet and the developer is thermally fixed thereto. After passing through the fixing unit 207, the recording sheet is discharged by the discharge rollers 208 to the sorter 220, which stores the discharged recording sheet in an appropriate storage bin. When sorting has not been instructed, however, the sorter 220 stores the recording sheet in the topmost storage bin.

When double-sided printing has been instructed, the recording sheet is fed as usual to the discharge rollers 208, but then the rotation of the discharge rollers 209 is reversed and the sheet is guided to the feedback path 210 by the flapper 209. When multiplex printing has been instructed, however, instead of first being fed to the discharge rollers 208, the recording sheet is guided directly to the feedback path 210 by the flapper 209. The recording sheet is then conveyed along the feedback path 210 to the transfer unit 206 at the above synchronization timing.

Figure 3:
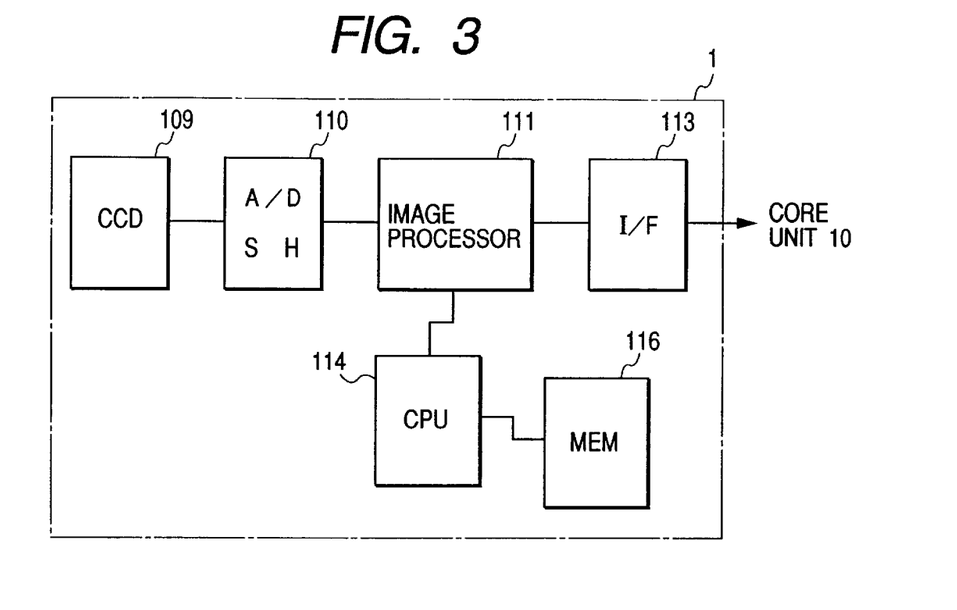
FIG. 3 is a block diagram for explaining the structure of the reader in FIG. 1.

FIG. 3 is a block diagram for explaining the structure of the reader 1 in FIG. 1. The reference numerals used in FIG. 1 are also employed in FIG. 3 to denote corresponding components.

In FIG. 3, an A/D SH unit 110 performs the analog/digital conversion of image data output by the CCD 109, and also performs shading compensation. An image processor 111 performs predetermined image processing for the image data processed by the A/D SH unit 110, and transmits the resultant image data to the printer 2. An I/F 113 then transmits the image data obtained by the A/D SH unit 110 to the core unit 10 of the image I/O controller 3.

A CPU 114 controls the image processor 111 and the I/F 113 in accordance with the setup entered at the monitor/operation unit 300. For example, when a copy mode for performing trimming and copying is set at the monitor/operation unit 300, the CPU 114 permits the image processor 111 to perform trimming and to transmit the result to the printer 2. When a facsimile transmission mode is set at the monitor/operation unit 300, the CPU 114 permits the I/F 113 to transmit, to the core unit 10, image data and a control command consistent with the specified mode.

A memory 116 is used to store the above described control program for the CPU 114, which exercises operational control while referring to the memory 116. The memory 116 is used also as a work area for the CPU 114.

The operations of the individual sections will now be described.

The A/D SH unit 110 performs the analog/digital conversion of image data received from the CCD 109, and also performs shading compensation. The resultant image data are then transmitted via the I/F 113 to the core unit 10 of the image I/O controller 3. At this time, the CPU 114 exercises control of the image processor 111 and the I/F 113 in accordance with the setup entered at the monitor/operation unit 300.

Figure 4:
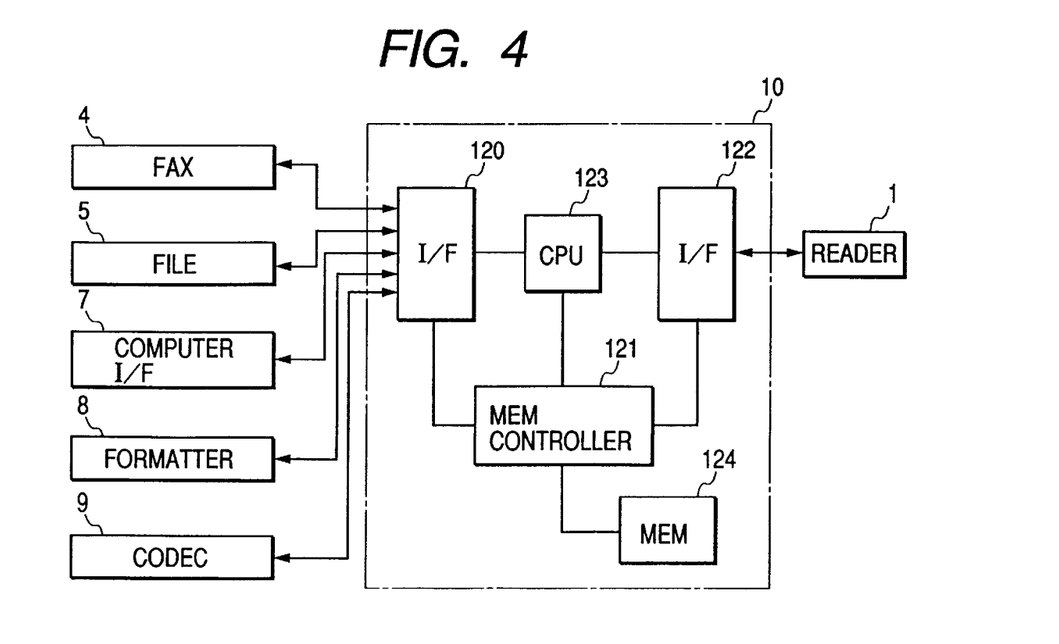
FIG. 4 is a block diagram for explaining the structure of a core unit in an image input/output controller shown in FIG. 1.

FIG. 4 is a block diagram for explaining the structure of the core unit 10 of the image I/O controller 3 shown in FIG. 1. The reference numerals used in FIG. 1 are also used in FIG. 3 to denote corresponding components.

In FIG. 4, image processing, such as the rotation of an image or the change of a scale, is performed for image data received from the reader 1 via an I/F 122. The resultant image data are transmitted via an I/F 120 to the facsimile unit 4, the file unit 5, the computer I/F 7, the formatter 8 or the codec 9 in accordance with a control command transmitted by the reader 1.

Code data, which are received via the computer I/F 7 and which represent an image, are transmitted to the formatter 8 where they are developed into image data. The image data are then transmitted to the printer 2.

Image data received from the facsimile unit 4 are transmitted to the printer 2, the file unit 5 and the computer I/F 7.

A CPU 123 exercises overall control of the multi-functional image processing apparatus in accordance with a control program stored in a memory 124 and a control command received from the reader 1. The memory 124 is constituted by a ROM in which the control program is stored, RAM that serves as a work area for the CPU 123, and nonvolatile memory in which are stored various setups entered at the monitor/operation unit 300. As is described above, a compound process comprising the reading of a document image, the printing of an image, the transmission and the reception of image data, the storage of image data, and the input/output of data received from a computer can be performed for which the core unit 10 is primarily employed.

Figure 5:
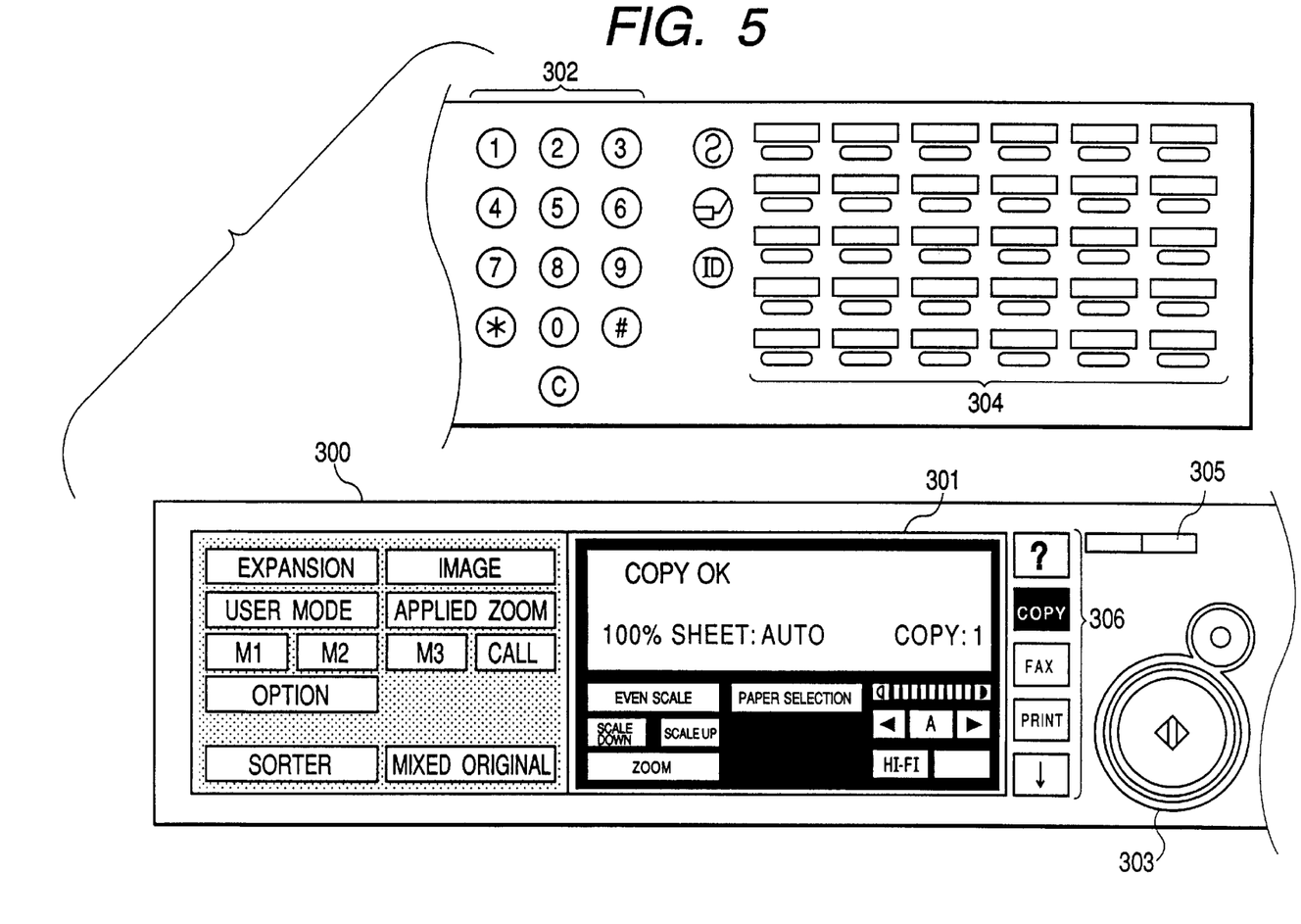
FIG. 5 is a plan view for explaining the structure of a monitor/operation unit shown in FIG. 1.

FIG. 5 is a plan view for explaining the structure of the monitor/operation unit 300 shown in FIG. 1.

In FIG. 5, displayed on a display unit 301 is the operating state of the multi-functional image processing apparatus and a message. The surface of the display unit 301 functions as a touch panel, and can serve as an instruction key panel when the surface is touched. Arranged to the right of the display unit 301 is a mode select key group 306. The display function can be changed by depressing one of the function keys in the mode select key group 306.

Number keys 302 are used for entering numerical values. For example, for setting the number of copies for a copy function screen, and for entering the destination telephone number for a facsimile function screen. Thus, when a start key 303 is depressed, copying is initiated for the copy function screen, facsimile transmission is started for the facsimile function screen, or recording to a file is begun for the file function screen.

A one-touch key 304 is used for facsimile transmission. By one-key manipulation, data can be transmitted to a destination that is registered in advance. A reset key 305 serves as a stop key to return the operating state to the initial state, or to halt an operation, such as copying.

The setups entered at the monitor/operation unit 300 are stored in the nonvolatile memory area in the memory 124 of the core unit 10. The display unit 301 is controlled by the CPU 123 of the core unit 10.

While referring to FIG. 6, an explanation will now be given for the operations (reading/input operation) of the individual sections employing the image memory 124 that is required for the above described compound process.

Figure 6:
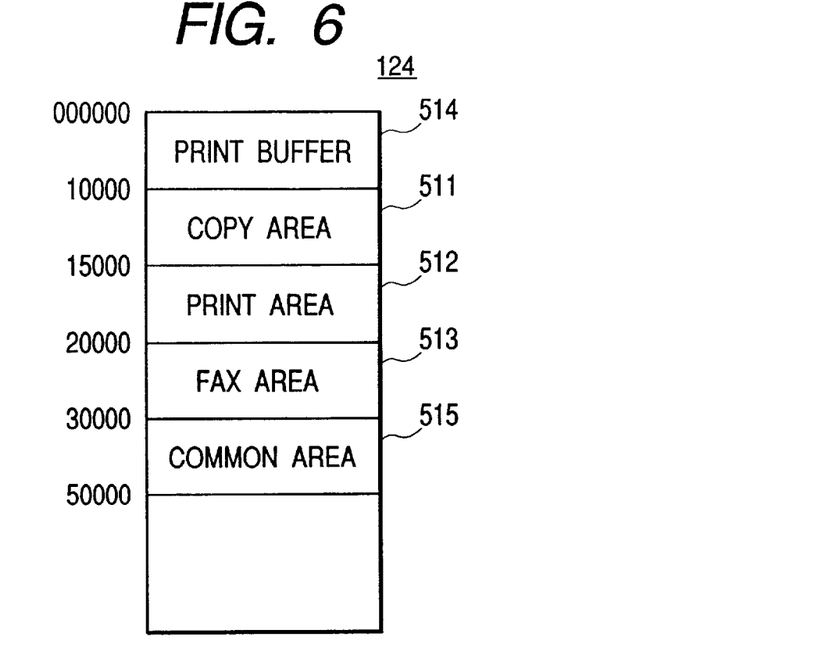
FIG. 6 is a diagram for explaining the structure of an image memory shown in FIG. 4.
Figure 7:
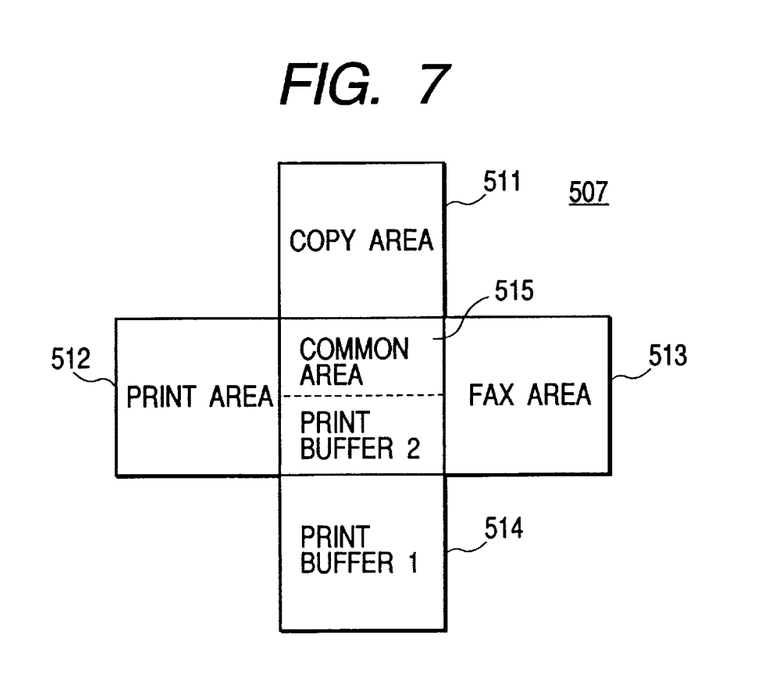
FIG. 7 is a specific diagram for explaining the structure of a memory area that is available in the image memory in FIG. 4.

FIG. 6 is a diagram showing work areas in the memory 124 in FIG. 4. FIG. 7 is a specific diagram for explaining the structure of a memory area that is available in the image memory 124 in FIG. 6. In this embodiment, the memory area consists of dedicated areas for the individual functions and a common area.

In FIGS. 6 and 7, a copy area 511 is used to store copy image data that are compressed by the codec 9 via a memory controller 121 and received from the reader 1.

A print area 512 is used to store print data that are obtained when a formatter (not shown) develops, into image data, PDL data that are received from an external computer via an interface (not shown) and that are compressed by the codec 9 via the memory controller 121.

A FAX area 513 is used to store image data that are compressed by the codec 9 via the memory controller 121 and are exchanged across the facsimile unit 4.

A print buffer 514 is used to store image data that are to be transmitted to be printed by the printer 2.

A common area 515 is used to store data that overflow the areas 511 to 513 or to develop print data that are to be printed next while data in the print buffer are being printed.

The operations of the individual sections will now be described. Since the exchange of image data with the file unit 5 is the same as the facsimile transmission/reception, no explanation for it will be given.

Figure 9:
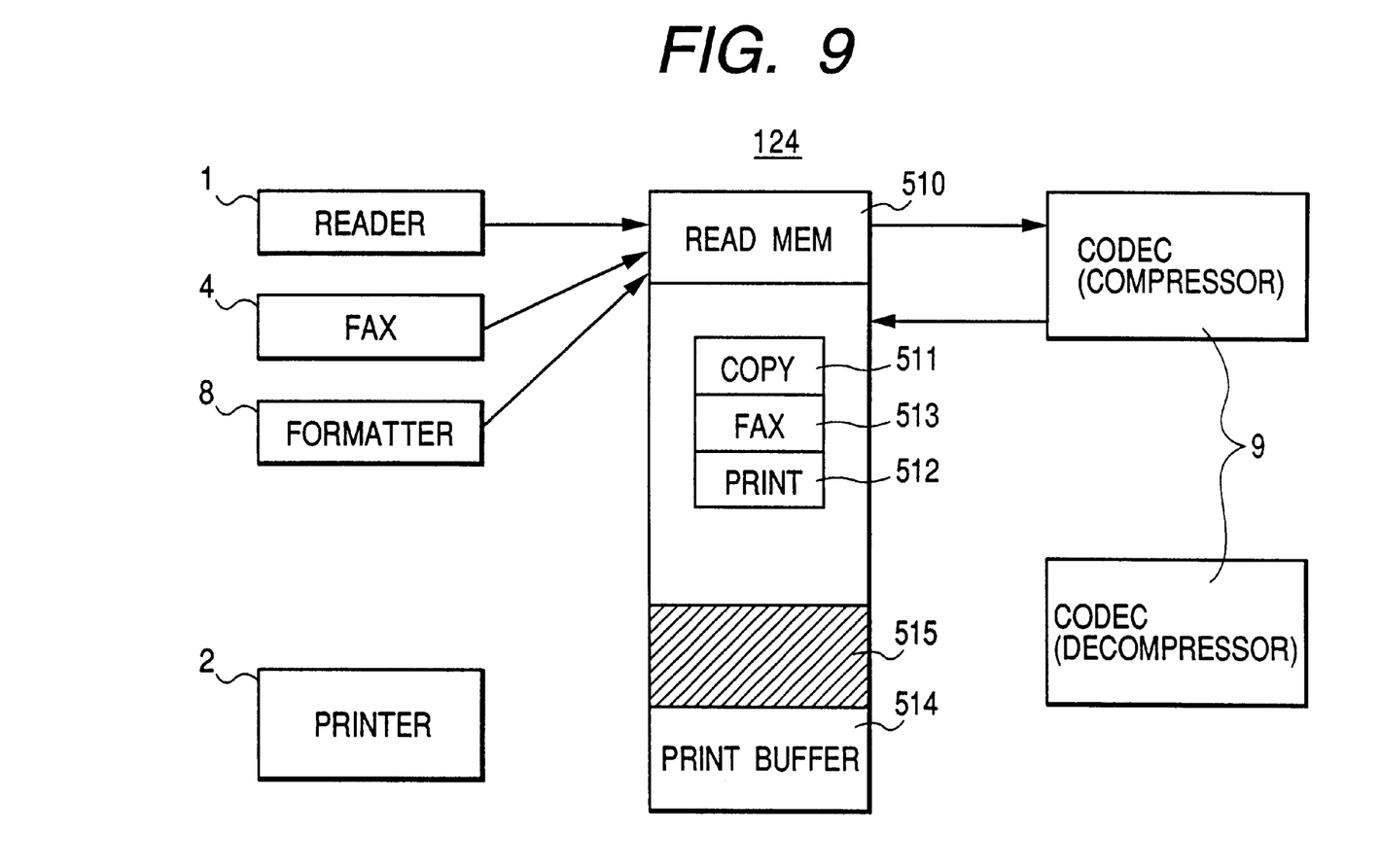
FIGS. 9 and 10 are diagrams for explaining the operation of the image processing apparatus of the present invention.

First, while referring to FIG. 9 an explanation will be given for the processing performed before the data are stored in the memory areas 511 to 513 for the individual functions.

(1) Copying

Image data transmitted from the reader 1 are temporarily stored in a read memory 510. The image data are then compressed by the codec 9 via the memory controller 121, and the resultant data are stored in the copy area 511 in accordance with a control command transmitted to the reader 1. The same process is performed to store data received by facsimile, and the compressed image data are stored in the fax area 513.

(2) Printing

Code data for an image that are received via the computer I/F 7 are stored in the print area 512, and are then transmitted to the formatter 8 and developed into image data. The resultant image data are temporarily stored in the read memory 510, and thereafter are compressed by the codec 9. The compressed data are stored in the print area 512.

(3) Facsimile Reception

The image data from the facsimile unit 4 are decompressed by the codec 9 using a CCU memory area and the resultant data are temporarily stored in the read memory 510. Thereafter, the image data are compressed by the codec 9 and the obtained data are stored in the fax area 513.

During the above operations, when there is no empty memory, image data are stored in the common area if it is available.

As is described above, while mainly employing the core unit 10, a compound process, composed of functions such as the reading of a document image, the printing of an image, the exchange of image data, the storage of image data and the input/output of data from a computer, is performed.

The characteristic arrangement employed for this embodiment will now be described while referring to FIGS. 4 and 6.

An image processing apparatus, which can perform, via the image memory 124, image processing during which multiple functions are performed in order to permit the thus structured printer and scanner to execute a digital copying function, comprises:

acquisition means for acquiring, in the image memory 124, data storage areas for individual functions that correspond to the multiple functions, and a common area that is shared by the individual functions (the CPU 123 obtains memory areas in the image memory 124 in accordance with a control program stored in external memory, such as in a ROM or on a hard disk (not shown));

determination means for determining, during a printing process performed by the printer, whether in addition to the data memory area acquired in the image memory, a print buffer area for one page can be obtained in the common area (the CPU 123 examines the image memory 124 in accordance with the control program stored in external memory, such as in a ROM or on a hard disk (not shown)); and control means for, when the determination means determines that a print buffer area for one page can not be obtained in the common area, accessing the data memory area acquired in the image memory to develop print data for one page and permitting the printer to print the resultant image, and for, when the determination means determines that a print buffer area for one page can be obtained in the common area, alternately accessing the memory data area and the common area acquired in the image memory to develop print data for one page and permitting the printer to print the image data. Therefore, the common area can be flexibly used as a dedicated memory area for each function in accordance with the changes in memory usage that occur during the operation. During the printing process, so long as a print buffer area for one page is available in the common area, print data can be constantly processed while a plurality of print buffers are alternately used for development and output, so that the efficiency of the printing process can be drastically improved and a considerable increase in the printing speed can be realized.

Further, the image processing apparatus additionally comprises compression/decompression means (the codec 9) for compressing data to be stored in the data storage area acquired in the image memory, or for decompressing data read from the data storage area. Therefore, the capacity of the memory areas required by individual functions can be reduced, and a data processing environment can be constructed wherein only a small memory capacity is required for the effective performance of multiple functions.

In addition, when the determination means (the CPU 123) ascertains that a job for writing to the common memory (the common area 515) is currently being executed, or is to be executed, the determination means determines that a print buffer area for one page can not be obtained in the common area. Therefore, when data processing is being simultaneously performed by a plurality of functions, and when as result of the execution of one of these functions the common area is in use and is not available, multi-function processing can be implemented during which printing can be continued by using a single print buffer, even though the processing speed is reduced. In the copying mode, the printing mode and a mode for the printing of data received by facsimile, the printing of data by the printer 2 is performed after the reading/inputting process has been is completed.

Figure 10:
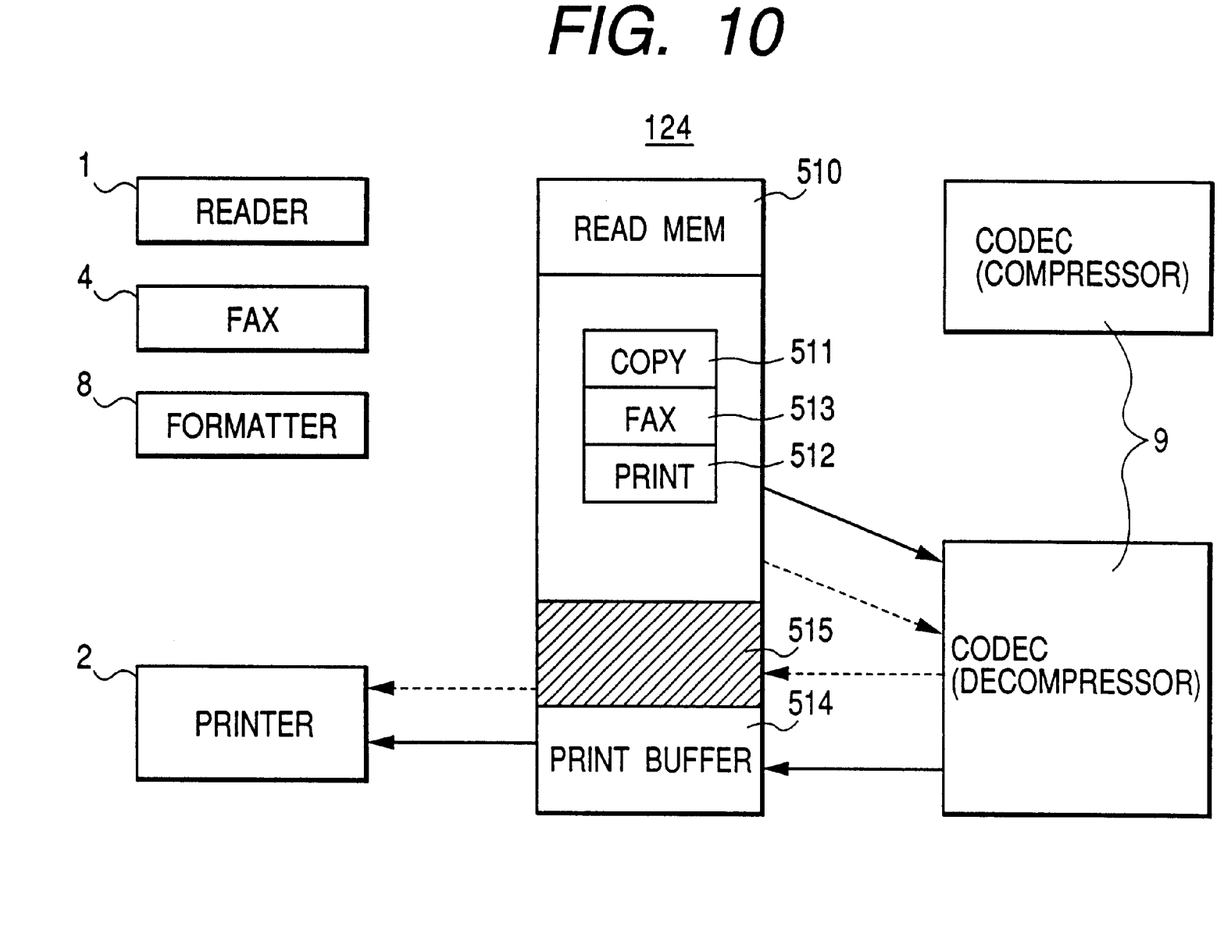

The printing process will now be described while referring to the flowchart in FIG. 8, and to FIG. 10.

Figure 8:
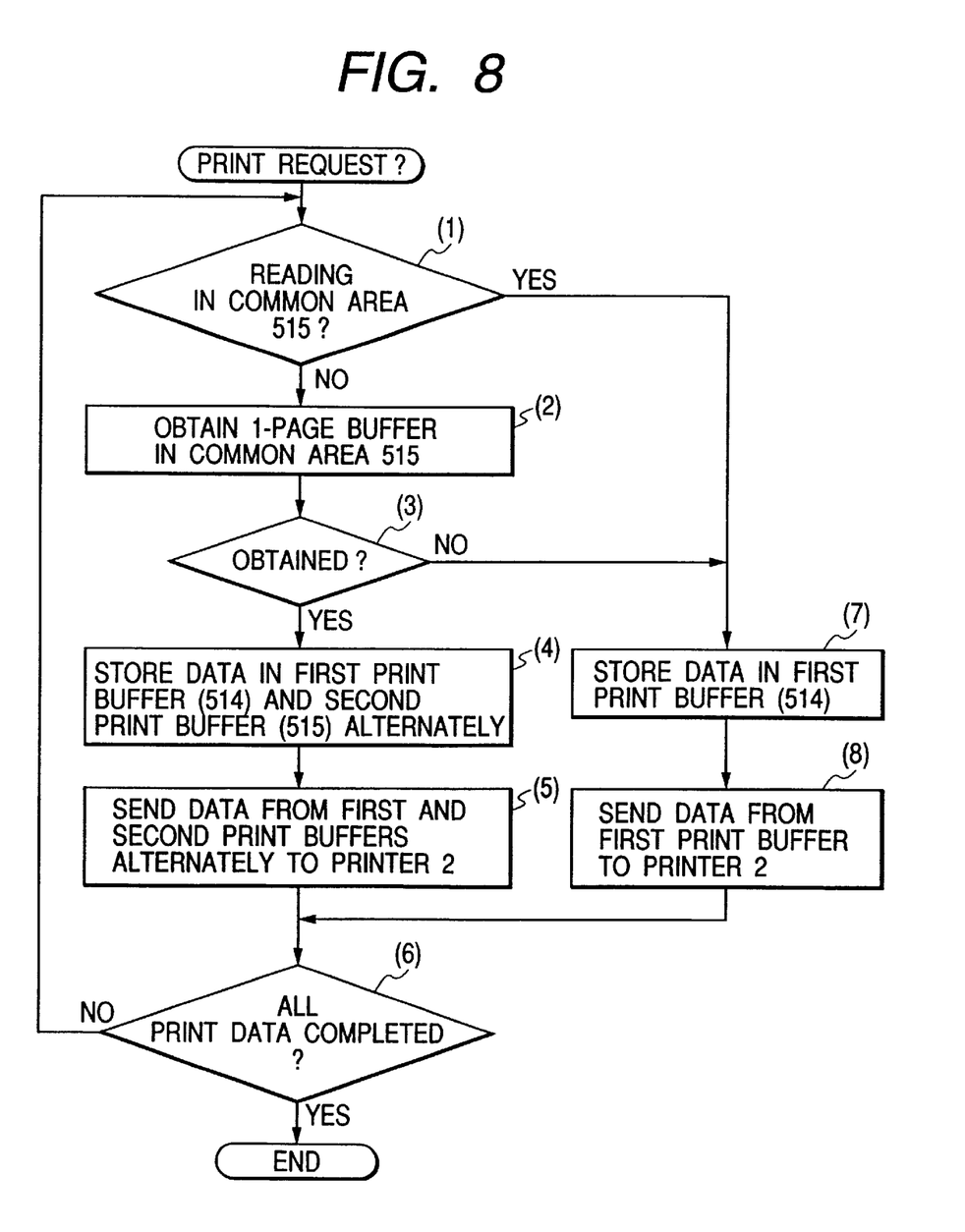
FIG. 8 is a flowchart showing a printing process performed by the image processing apparatus according to the present invention.

FIG. 8 is a flowchart showing the printing process performed by the image processing apparatus according to the present invention. The notations (1) to (8) represent the individual steps.

First, a check is performed to determine whether reading is being performed in the common area 515 that serves as memory in the image memory 124. When it is found that reading is being performed, the common area 515 can not be used as a print buffer and program control moves to step (7), whereat compressed image data that are stored in dedicated areas are developed by the codec 9 for each of the pages in the print buffer 514. At step (8), the print data that are developed for each of the pages in the print buffer 514 are transmitted via the memory controller 121 to the printer 2. Program control then goes to step (6) (as indicated by the solid lines and arrows in FIG. 10).

When, at step (1), it is ascertained that the reading is not being performed, at step (2) a buffer for one page is obtained in the common area 515. Then, at step (3), a check is performed to determine whether a buffer was obtained. When a buffer was not obtained, or when compressed data copy overflows the copy area, program control moves to step (7).

When, at step (3), it is ascertained that a buffer for one page was obtained, at step (4), print data in the print buffer (first buffer) 514 and in the print buffer (second buffer) obtained in the common area 515 are alternately developed for each page. At step (5), the print data that were developed are alternately read from the first and the second buffers and output to the printer 2 via a print controller 504 (as indicated by the arrows, and the solid lines and the broken lines in FIG. 10).

When, at step (5) or (8), image data are output for one page, at step (6) a check is performed to determine whether the image data for all the pages have been printed. When the printing has been completed, the processing is thereafter terminated. But when there are image data remaining, program control returns to step (1), and steps (1) to (8) are repeated.

When the common area 515 can not be used as a print buffer (second buffer), image data to be printed are developed in the print buffer (first buffer). And after image data in the print buffer 514 have been output, a check is performed to determine whether there are any image data remaining. In accordance with the use condition, which changes dynamically, of the common memory, a print buffer is obtained in the common area as often as possible, so that the throughput of the printing during the execution of the compound processing can be noticeably improved.

The characteristic arrangement of the embodiment will now be described while referring to the flowchart in FIG. 8.

A data processing method for an image processing apparatus, which can perform, via the image memory 124, image processing during which multiple functions are performed in order to permit the thus structured printer and scanner to execute a digital copying function, or a memory medium on which a computer-readable program is stored for controlling an image processing apparatus, which can perform, via the image memory 124, image processing during which multiple functions are performed in order to permit the thus structured printer and scanner to execute a digital copying function, comprises:

an acquisition step (step (2) in FIG. 8) of acquiring, in the image memory, data storage areas for individual functions that correspond to the multiple functions, and a common area that is shared by the individual functions;

a determination step (step (3) in FIG. 8) of determining, during a printing process performed by the printer, whether in addition to the data memory area acquired in the image memory, a print buffer area for one page can be obtained in the common area;

a first development/output step (steps (7) and (8) in FIG. 8) of, when it is determined at the determination step that a print buffer area for one page can not be obtained in the common area, accessing the data memory area acquired in the image memory to develop print data for one page and permitting the printer to print the resultant image; and a second development/output step of, when it is determined at the determination step that a print buffer area for one page can be obtained in the common area, alternately accessing the memory data area and the common area acquired in the image memory to develop print data for one page and permitting the printer to print the image data.

Therefore, the common area can be flexibly used as a dedicated memory area for each function in accordance with the changes in memory usage that occur during the operation. During the printing process, so long as a print buffer area for one page is available in the common area, print data can be constantly processed while a plurality of print buffers are alternately used for development and output, so that the efficiency of the printing process can be drastically improved and a considerable increase in the printing speed can be realized.

Further, the data processing method or the program stored on the memory medium additionally comprises a compression/decompression step of compressing data to be stored in the data storage area acquired in the image memory, or of decompressing data read from the data storage area. Therefore, the capacity of the memory areas required by individual functions can be reduced, and a data processing environment can be constructed wherein only a small memory capacity is required for the effective performance of multiple functions.

In addition, when it is ascertained at the determination step that a job for writing to the common memory is currently being executed, or is to be executed, it is determined at the determination step that a print buffer area for one page can not be obtained in the common area. Therefore, when data processing is being simultaneously performed by a plurality of functions, and when as result of the execution of one of these functions the common area is in use and is not available, multi-function processing can be implemented during which printing can be continued by using a single print buffer, even though the processing speed is reduced.

In this embodiment, the function in FIG. 8 may be implemented by a host computer in accordance with an externally installed program. In this case, the present invention can be applied when an information group, including a program, stored in a local memory medium, or stored in an external memory medium connected to a network, is supplied to an output device such as a CD-ROM, a flash memory or an FD.

As is described above, the objective of the present invention can also be achieved by loading into a system, or a device, a memory medium on which is recorded software program code for accomplishing the functions of the embodiment, and by the program code that is stored on the storage medium being read and executed by a computer (a CPU or an MPU) in the system, or in the device.

In this case, the program code that is read from the memory medium implements the innovative functions provided by the present invention, and the memory medium on which the program code is stored accomplishes the present invention.

A memory medium on which the program code is recorded is, for example, a floppy disk, a hard disk, an optical disk, a magneto optical disk, a CD-ROM, a CD-R, a magnetic tape, a nonvolatile memory card, a ROM, or a EEPROM.

In addition, not only can the functions in the previous embodiment be performed when program code is read and executed by the computer, but also, in accordance with instructions in the program code, part or all of the actual processing required to perform the functions in the above embodiment can be accomplished by an OS (Operating System) that is running on the computer.

Furthermore, to accomplish the functions included in the above embodiment, the present invention also provides for program code to be read from a memory medium and written in memory mounted on a function expansion board, which is inserted into a computer or a printer, or in memory mounted in a function expansion unit, which is connected to a computer or to a printer, and for, in consonance with instructions included in the program code, part or all of the processing to be performed by a CPU mounted on the function extension board or mounted in the function extension unit.

Although the present invention has been described in its preferred form with a certain degree of particularity, many apparently widely different embodiments of the invention can be devised without departing from the spirit and the scope thereof. It is to be understood that the invention is not limited to specific embodiments thereof, except as defined in the appended claims.

What is claimed is:

1. An image processing apparatus, which during image processing simultaneously performs multiple functions while employing an image memory that is used by a printer and a scanner to perform digital copying, comprising:
   acquisition means for acquiring, in the image memory, a data storage area for each individual function of the multiple functions that are being performed and a common area that is used in common by the individual functions;
   determination means for determining, during a printing process performed by the printer, whether, in addition to the data storage area acquired in the image memory, a print buffer area for one page is obtainable in the common area; and
   control means for, when said determination means ascertain that a print buffer area for one page is not obtainable in the common area, accessing the data storage area for the image memory, and developing print data for one page and employing the printer to print resultant data, and for, when said determination means determines that a print buffer area for one page is obtainable in the common area, accessing the data storage area and the common area in the image memory, and developing print data for one page and employing the printer to print resultant data.

2. An image processing apparatus according to claim 1, further comprising compression/decompression means for compressing data to be stored in the data storage area acquired in the image memory, or for decompressing data read from the data storage area.

3. An image processing apparatus according to claim 1, wherein said determination means determines that a print buffer area for one page is not obtainable in the common area when said determination means ascertain that a job for writing to the common memory is currently being executed or is to be executed.

4. A data processing method, for an image processing apparatus that during image processing simultaneously performs multiple functions while employing an image memory that is used by a printer and a scanner to perform digital copying, said data processing method comprising:
   an acquisition step of acquiring, in the image memory, a data storage area for each individual function of the multiple functions that are being performed and a common area that is used in common by the individual functions;
   a determination step of determining, during a printing process performed by the printer, whether in addition to the data storage area acquired in the image memory, a print buffer area for one page is obtainable in the common area;
   a first development/output step of, when it is ascertained at said determination step that a print buffer area for one page is not obtainable in the common area, accessing the data storage area for the image memory, and developing print data for one page and employing the printer to print resultant data; and
   a second development/output step of, when it is ascertained at said determination step that a print buffer area for one page is obtainable in the common area, accessing the data storage area and the common area in the image memory, and developing print data for one page and employing the printer to print resultant data.

5. A data processing method according to claim 4, further comprising a compression/decompression step of compressing data to be stored in the data storage area acquired in the image memory, or of decompressing data read from the data storage area.

6. A data processing method according to claim 4, wherein it is determined at said determination step that a print buffer area for one page is not obtainable in the common area when it is ascertained at said determination step that a job for writing to the common memory is currently being executed or is to be executed.

7. A computer-readable memory medium that stores a program for implementing a data processing method in an image processing apparatus that during image processing simultaneously performs multiple functions while employing an image memory that is used by a printer and a scanner to perform digital copying, the method comprising:
   an acquisition step of acquiring, in the image memory, a data storage area for each individual function of the multiple functions that are being performed and a common area that is used in common by the individual functions;
   a determination step of determining, during a printing process performed by the printer, whether in addition to the data storage area acquired in the image memory, a print buffer area for one page is obtainable in common area;
   a first development/output step of, when it is ascertained at said determination step that a print buffer area for one page is not obtainable in the common area, accessing the data storage area for the image memory, and developing print data for one page and employing the printer to print resultant data; and
   a second development/output step of, when it is ascertained at said determination step that a print buffer area for one page is obtainable in the common area, accessing the data storage area and the common area in the image memory, and developing print data for one page and employing the printer to print resultant data.

8. A memory medium according to claim 7, wherein the method further comprises a compression/decompression step of compressing data to be stored in the data storage area acquired in the image memory, or decompressing data read from the data storage area.

9. A memory medium according to claim 7, wherein it is determined at said determination step that a print buffer area for one page is not obtainable in the common area when it is ascertained at said determination step that a job for writing to the common memory is currently being executed or is to be executed.

10. A digital copier comprising:
    a first page print buffer;
    a common memory used for a plurality of applications;
    means for compressing image data and for storing compressed image data;

means for, before printing, decompressing the stored image data and for developing resultant image data;

determination means for determining, before printing, whether in addition to said first page print buffer a second page print buffer for one page is available in real time in said common memory; and control means for, when the second page print buffer is available for printing, alternately developing the decompressed image data for one page in said first page print buffer and the second page print buffer and printing resultant image data, and for, when the second page print buffer is not available, developing the image data only in said first page print buffer and printing resultant image data.

11. A digital copier according to claim 10, wherein said determination means determines that the second page print buffer is not obtainable when a job of writing to said common memory is currently being executed or is to be executed.

12. An image processing apparatus comprising an inputter, arranged to input data, a printer, arranged to print an image based on data inputted by said inputter, a print buffer, arranged to be used for printing by said printer;

a common memory, arranged to be used for printing and another function;

a determiner, arranged to determine, in a case where printing is to be performed by said printer, whether or not said common memory is usable for the printing; and a controller, arranged to control said printer to perform the printing by using said print buffer and said common memory, if it is determined by said determiner that said common memory is usable for the printing, and to perform the printing by using said print buffer without using said common memory, if it is determined by said determiner that said common memory is not usable for the printing.

13. An image processing apparatus according to claim 12, wherein said inputter inputs the data from a reader, which reads an image and generates the data based on the image, and said common memory stores the data inputted from the reader.

14. An image processing apparatus according to claim 12, wherein said inputter inputs the data, which is received by a facsimile communication, and said common memory stores the data received by the facsimile communication.

15. An image processing apparatus according to claim 12, wherein said inputter inputs the data, which is received from a computer terminal as a PDL data, and said common memory stores the data received from the computer terminal as the PDL data.

16. An image processing apparatus according to claim 12, wherein, when a storage area of a predetermined size to be used for the printing by said printer is securable in said common area, said determiner determines that said common memory is usable for the printing.

17. An image processing method comprising:

an inputting step of inputting data;

a printing step of printing by a printer an image based on data inputted in said inputting step, wherein the printer includes a print buffer used for the printing in said printing step and a common memory used for the printing and another function;

a determining step of determining, in a case where the printing is performed in said printing step, whether or not the common memory is usable for the printing; and a controlling step of controlling said printing step to perform the printing by using the print buffer and the common memory, if it is determined in said determining step that the common memory is usable for the printing, and to perform the printing by using the print buffer without using the common memory, if it is determined in said determining step that the common memory is not usable for the printing.

18. A computer-readable program product embodying a program for implementing an image processing method, the method comprising:

an inputting step of inputting data;

a printing step of printing by a printer an image based on data inputted in said inputting step, wherein the printer includes a print buffer used for the printing in said printing step and a common memory used for the printing and another function;

a determining step of determining, in a case where the printing is performed in said printing step, whether or not the common memory is usable for the printing; and a controlling step of controlling said printing step to perform the printing by using the print buffer and the common memory, if it is determined in said determining step that the common memory is usable for the printing, and to perform the printing by using the print buffer without using the common memory, if it is determined in said determining step that the common memory is not usable for the printing.

* * * * *

UNITED STATES PATENT AND TRADEMARK OFFICE
CERTIFICATE OF CORRECTION

PATENT NO.    : 6,603,570 B2
DATED         : August 5, 2003
INVENTOR(S)   : Takako Asahi It is certified that error appears in the above-identified patent and that said Letters Patent is hereby corrected as shown below:

<u>Title page,</u>
Item [*] Notice, insert -- [*] Notice:    This patent issued on a continued prosecution application filed under 37 CFR 1.53(d), and is subject to the twenty year patent term provisions of 35 U.S.C. 154(a)(2). --

<u>Column 2,</u>
Line 47, "is being" should read -- is --.

<u>Column 3,</u>
Lines 16 and 54, "is being" should read -- is --.

<u>Column 4,</u>
Lines 10 and 30, "is being" should read -- is --.

<u>Column 7,</u>
Line 19, "rollers 209" should read -- rollers 208 --.

<u>Column 10,</u>
Line 49, "been is" should read -- been --.

<u>Column 12,</u>
Line 55, "or a" should read -- or an --.

UNITED STATES PATENT AND TRADEMARK OFFICE
CERTIFICATE OF CORRECTION

PATENT NO. : 6,603,570 B2
DATED : August 5, 2003
INVENTOR(S) : Takako Asahi It is certified that error appears in the above-identified patent and that said Letters Patent is hereby corrected as shown below:

Column 13,
Line 31, "tain" should read -- tains --.
Line 49, "ascertain" should read -- ascertains --.

Signed and Sealed this

Twenty-second Day of June, 2004

JON W. DUDAS
*Acting Director of the United States Patent and Trademark Office*